United States Patent [19]
Hiller

[11] Patent Number: 5,892,502
[45] Date of Patent: Apr. 6, 1999

[54] KEYBOARD INCORPORATING COMPUTER STORAGE DEVICE

[76] Inventor: Jeffrey H. Hiller, 4 Brittany Meadows, Atherton, Calif. 94027

[21] Appl. No.: 671,936

[22] Filed: Jun. 28, 1996

[51] Int. Cl.⁶ ........................................................ G09G 5/00
[52] U.S. Cl. .............................. 345/168; 345/169; 341/22
[58] Field of Search ..................................... 345/168, 169, 345/172; 341/20, 21, 22; 364/709.12, 709.13; 400/473, 472, 477, 719

[56] References Cited

U.S. PATENT DOCUMENTS

| | | | |
|---|---|---|---|
| 4,181,966 | 1/1980 | Wenninger et al. | 364/715 |
| 4,786,768 | 11/1988 | Langewis et al. | 200/6 A |
| 5,034,574 | 7/1991 | Martovitz | 200/6 A |
| 5,049,863 | 9/1991 | Oka | 340/710 |
| 5,144,302 | 9/1992 | Carter et al. | 341/20 |
| 5,307,297 | 4/1994 | Iguchi et al. | 364/708.1 |
| 5,411,341 | 5/1995 | Ullman | 400/489 |
| 5,438,331 | 8/1995 | Gilligan et al. | 341/35 |
| 5,442,378 | 8/1995 | Yasuhara et al. | 345/168 |
| 5,452,960 | 9/1995 | Kuhlenschmidt | 400/487 |
| 5,477,510 | 12/1995 | Ukita | 369/18 |
| 5,572,399 | 11/1996 | Shirato et al. | 361/680 |
| 5,694,124 | 12/1997 | Wood | 341/22 |

*Primary Examiner*—Jeffery A. Hofsass
*Assistant Examiner*—Ashok Mannava
*Attorney, Agent, or Firm*—Burns, Doane, Swecker & Mathis, LLP

[57] ABSTRACT

A storage device such as a CD, DVD or other optical disk drive is incorporated into the keyboard housing in what would normally be the numeric keypad area. The drive may be of a flip-top variety or may be of a type having a mechanized insertion drawer. A headphone output jack is provided such that a user may pop a CD or other recording into the drive and listen to it through headphones. A touch-screen LCD display may be provided in the numeric keypad area and may function as a control panel for the drive, providing volume controls, scanning controls, etc. When the drive is not in use, the touch-screen LCD display may be used to realize a virtual keypad, therefore making more effective use of what would normally be the numeric keypad area without sacrificing the functionality of a numeric keypad. The drive may be connected to the computer through a standard input port in the same manner as an external CD ROM drive. In an alternative embodiment, a known high-speed multiplexed serial connection protocol is applied to the keyboard connection, eliminating the need for an additional connection.

13 Claims, 4 Drawing Sheets

KEYBOARD INCORPORATING COMPUTER STORAGE DEVICE

BACKGROUND OF THE INVENTION

1. Field of the Invention

The present invention relates to computer I/O for personal computers.

2. State of the Art

Personal computing is presently in a state of flux as personal computers having computing power rivaling the mainframe computers of not many years ago become widely available at affordable prices. Available computing power has passed the threshold required for many computationally intensive tasks, making possible multimedia, or media-rich, computing without the need for expensive hardware. Because of strong consumer demand, opportunities for computer hardware and software companies have seldom seemed brighter, and personal computing appears to have nearly taken on the status of a national obsession.

The usefulness of personal computers, however, depends on the ability to connect to the computer varied peripheral devices including keyboard, mouse, display, printer, scanner, disk drive, modem, speakers, a microphone, etc. A typical computer is provided with specific connectors for many of these devices as well as general-purpose connectors that may serve any of a wide variety of devices. Despite the desirability of such expansion capabilities, the result is often a maze of cables and a crowded, visually distracting work area. To avoid this situation, computer makers are continually exercising trade-offs between what to include internal to the computer and what to provide external connections for. Still, as the breathtaking pace of innovation in personal computers continues, considerable difficulty remains in providing connections to the computer in order to achieve an attractive trade-off between functionality on the one hand and simplicity on the other.

Of course, many peripheral devices may be installed as internal devices within the housing of the computer. For the average computer user, however, installing such a peripheral device oneself is not a serious consideration. Having it installed is a nuisance. The average user would much prefer a "plug-and-play" solution that minimizes cable clutter and desktop sprawl.

SUMMARY OF THE INVENTION

The present invention address the foregoing problem by first recognizing that the one peripheral device already present in the bulk of all desktop systems is a keyboard. In a conventional keyboard, keys are arrayed in three principle areas of the keyboard, including a "QUERTY" area, a function-key area, and a numeric keypad area. In operation, however, the numeric keypad is seldom used. An opportunity is therefore presented to make more effective use of this area. In one embodiment of the invention, a storage device such as a CD, DVD or other disk drive is incorporated into the keyboard housing in what would normally be the numeric keypad area. The drive may be optical, magnetic, magneto-optical, etc. The drive may be of a flip-top variety or may be of a type having a mechanized insertion drawer. A headphone output jack is provided such that a user may pop a CD or other recording into the drive and listen to it through headphones. Speaker jacks are also provided. A touch-screen LCD display may be provided in the numeric keypad area and may function as a control panel for the drive, providing volume controls, scanning controls, etc. When the drive is not in use, the touch-screen LCD display may be used to realize a virtual keypad, therefore making more effective use of what would normally be the numeric keypad area without sacrificing the functionality of a numeric keypad. The drive may be self-contained within the keyboard, or may be connected to the computer through a standard input port in the same manner as an external CD ROM drive.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

Figure 1:
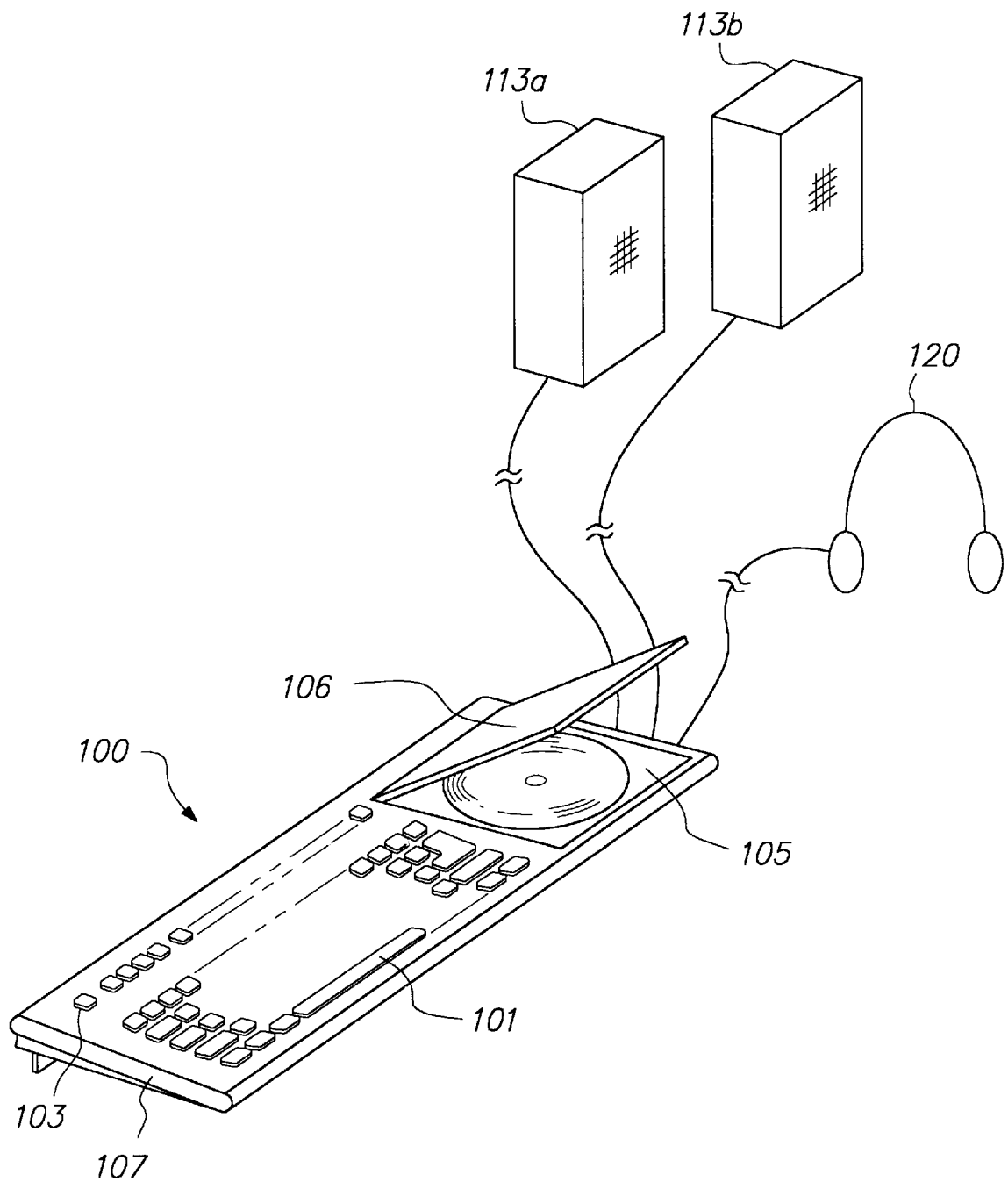
FIG. 1 is a perspective view of a computer keyboard including an optical drive of the flip-top type, the drive being open.

Referring now to FIG. 1, a perspective view is shown of a keyboard 100 in accordance with one aspect of the invention. In an illustrated embodiment, the keyboard 100 differs from the arrangement of a conventional keyboard. In a conventional keyboard, keys are arrayed in three principle areas of the keyboard, including a "QUERTY" area, a function-key area, and a numeric keypad area. In operation, however, the numeric keypad is seldom used. An opportunity is therefore presented to make more effective use of this area. The keyboard 100 makes more effective use of what would normally be the numeric keypad area, without sacrificing the functionality of a numeric keypad.

In particular, unlike a conventional keyboard, the keyboard 100 provides within the numeric keypad area a storage device 105 such as a CD ROM drive, DVD drive, Zip™ Drive floppy drive sold by Iomega Corporation of Roy, Utah, EZ™ Winchester-type drive sold by SyQuest Technology of Fremont, Calif., etc. The storage device 105 and the keyboard share a common housing 107. The arrangement of keys within a QUERTY area 101 and a function-key area 103 of the keyboard 100 may be substantially unchanged from a conventional keyboard. Preferably, the CD ROM drive is provided with a headphone output jack to allow for the use of headphones 120 and speaker outputs to allow for the connection of speakers 113*a* and 113*b*.

Figure 2:
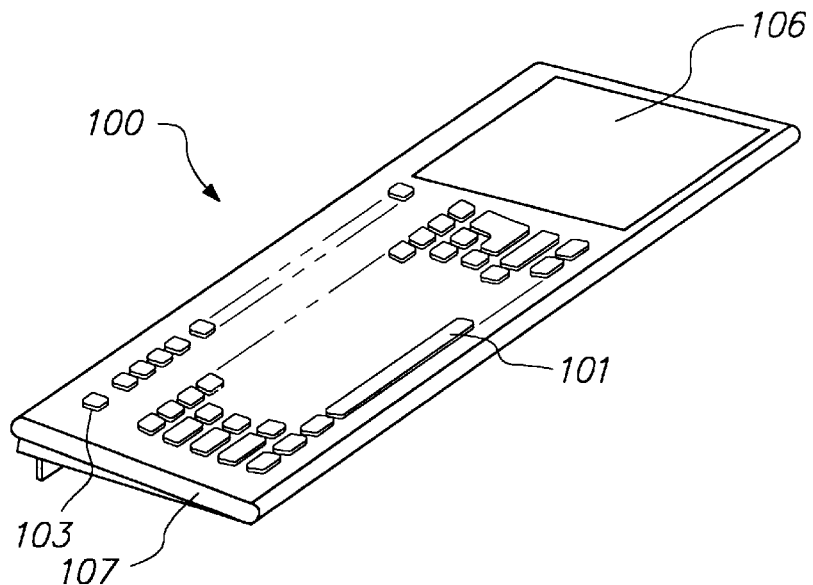
FIG. 2 is a perspective view of a computer keyboard of FIG. 1 with the drive closed.

As seen more clearly in FIG. 2, a lid of the CD ROM or other drive may be formed by a touch-screen LCD display 106. In one mode of operation, the touch-sensitive LCD display functions as a control panel for the CD ROM drive. In another mode of operation, the touch-screen LCD display functions as a numeric keypad. A touch-key may be displayed on the touch-screen LCD display for toggling between the two modes of operation.

Figure 3:
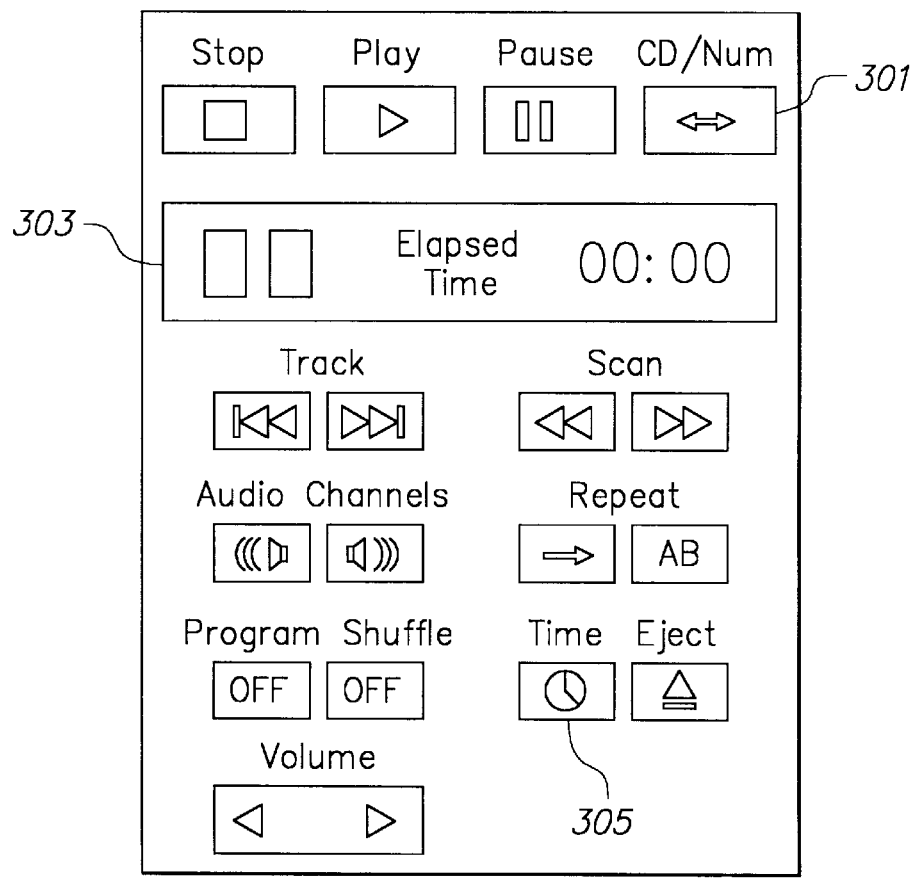
FIG. 3 is a screen display of the computer keyboard of FIG. 2 in control panel mode.

Referring more particularly to FIG. 3, the display contents of the touch-screen LCD panel during a control panel mode of operation are shown. Touch-keys may be provided to stop, play, or pause the program. A touch-key 301 is used to toggle between control panel mode and numeric keypad mode. A display box 303 displays the track number and either the elapsed time or time remaining, depending on the status of a toggle switch 305. Tracking and scanning controls are provided, as well as audio channel (left active, right active, both active) and repeat controls. Program and shuffle controls may be used to specify a sequence of tracks to be played or to vary the order in which the tracks are played. An eject control may be provided in the case of drives having a mechanical insertion drawer. Finally, a volume control is provided. The control panel of FIG. 3 is merely illustrative. The particulars of the control panel are of only passing consequence to the present invention.

Besides listening to recordings, in other embodiments, the CD ROM or other drive may be used to play games as described more fully in U.S. patent application Ser. No. 08/671,648, now U.S. Pat. No. 5,699,059, filed on even date herewith and incorporated herein by reference.

Figure 4:
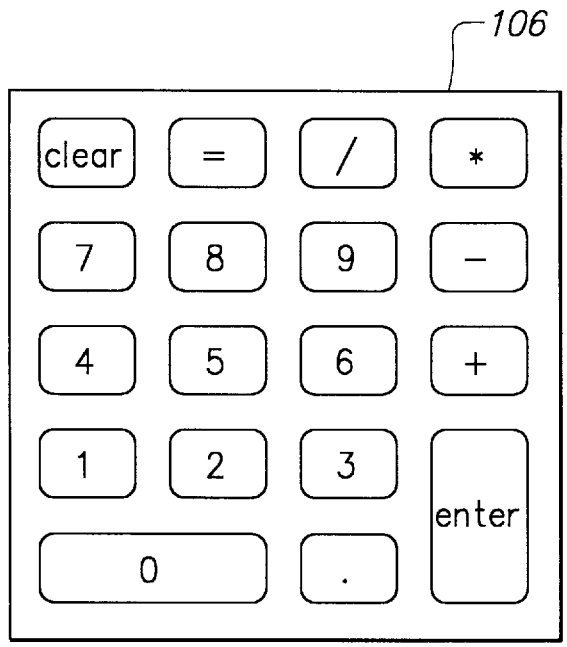
FIG. 4 is a screen display of the computer keyboard of FIG. 2 in numeric keypad mode.

Referring to FIG. 4, in numerics mode, the touch-screen LCD display operates as a numeric keypad mode in which the image of a conventional keypad is displayed on the LCD. The user uses the keypad by touching the desired key. The touch of the user's finger in relation to the desired key is sensed by the touch-screen LCD, causing a code representing actuation of the "key" to be output by the keyboard.

In the case of a DVD drive, the touch-screen LCD display may be used to display a video portion of the program.

As may be appreciated from the foregoing description, the CD ROM or other drive does not require any connection to a computer. Power for the drive may be obtained from the keyboard cable or from a separate power cord. In many instances, however, it will be desirable to connect the drive (a Zip™ drive, for example) to a computer. A separate cable may therefore be provided between the drive and the computer in the same manner as with a conventional external drive.

Figure 5:
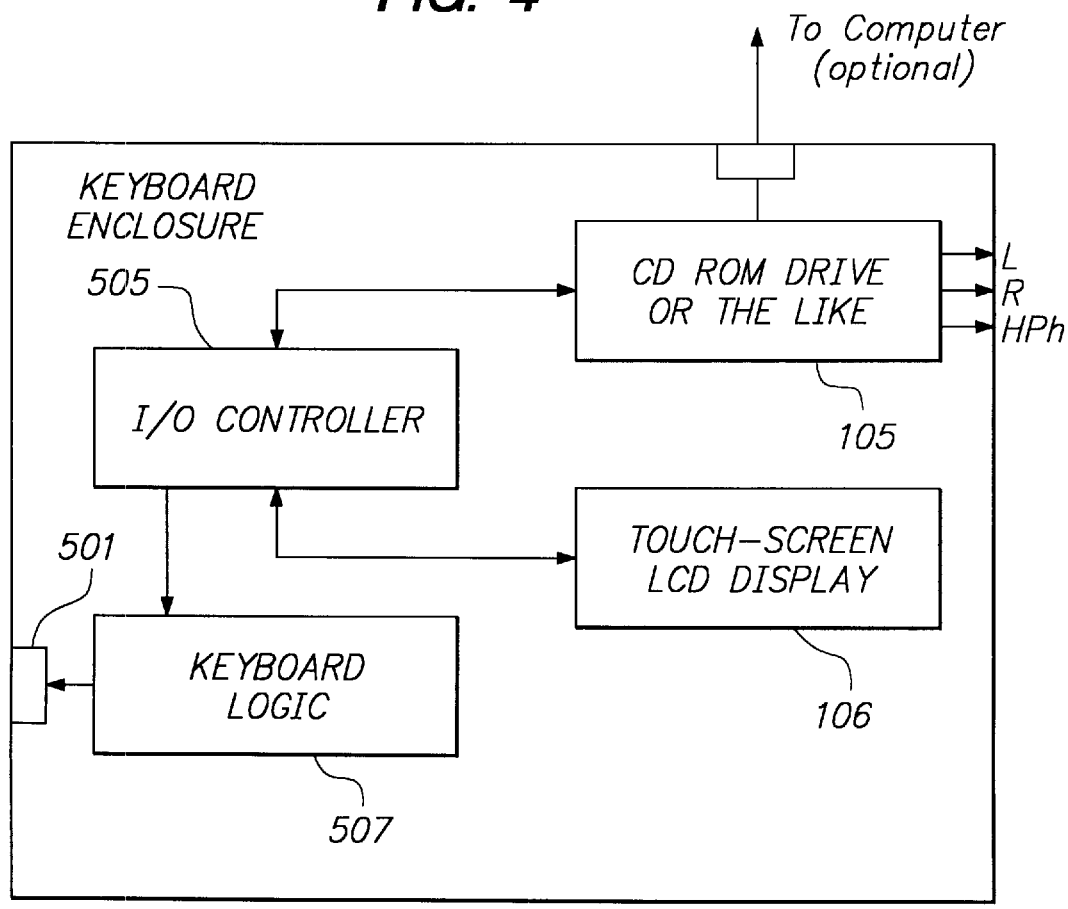
FIG. 5 is a hardware block diagram of one embodiment of the keyboard of FIG. 1.

Referring to FIG. 5, a hardware block diagram is shown of the keyboard of FIG. 1.

An I/O controller 505 includes circuitry to satisfy the particularized I/O requirements of the drive 105 and associated touch-screen LCD display 106, and may be realized as an Application-Specific Integrated Circuit (ASIC), for example. The I/O controller is also connected to the keyboard logic 507 to enable the touch-screen LCD display 106 to function as a numeric keypad in a numeric keypad mode of operation.

In other embodiments of the invention, the profile of the drive to be incorporated into the keyboard enclosure may be sufficiently thin to allow for the incorporation within the keyboard without modifying the key arrangement In this instance, the numeric keypad may remain unchanged. Furthermore, the drive may not require any controls other than a possible eject button.

Figure 6:
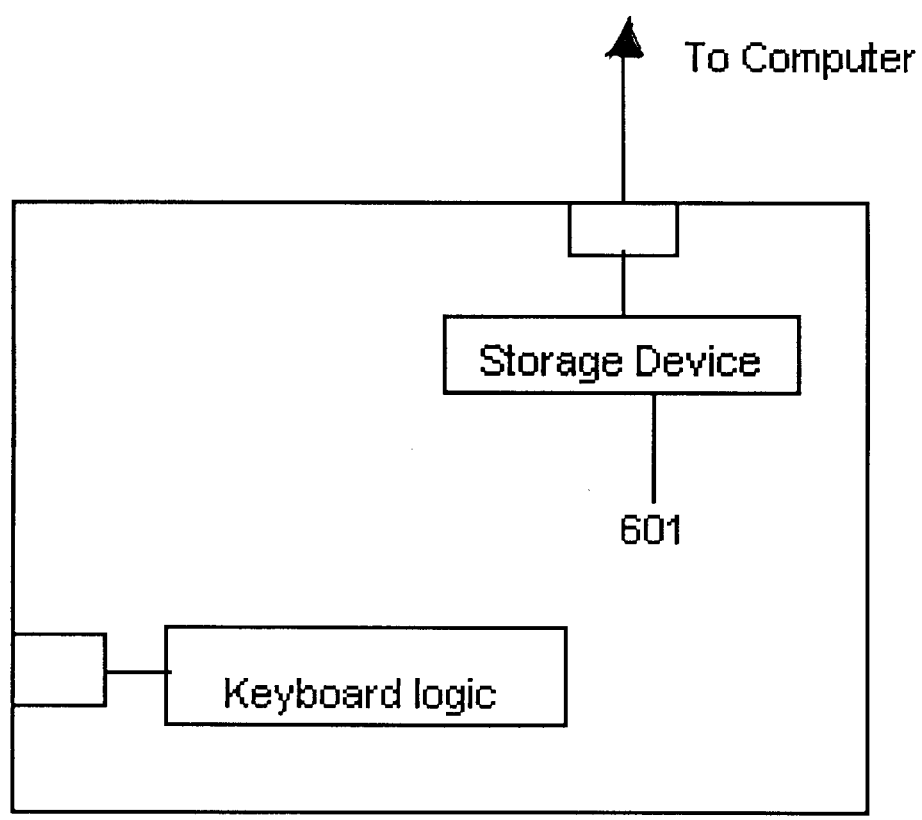
FIG. 6 is a hardware block diagram of another embodiment of the keyboard of FIG. 1.

Referring to FIG. 6, there is shown a generalized storage device 601 incorporated within the keyboard enclosure. The storage device may be any type of dynamic or other storage device, including but not limited to a CD ROM or DVD drive, a Zip™ drive, a high-density floppy drive or a next-generation high capacity floppy drive supported by a consortium consisting of Matsushita, Compaq and 3M Corporations.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A computer keyboard comprising:

a keyboard housing;

a key mechanism coupled to keyboard logic for capturing keystroke information;

a communications port coupled to the keyboard logic for communicating keystroke information to an exterior of the keyboard housing; and a dynamic data storage device characterized by relative motion between a storage medium and a read mechanism;

wherein the data storage device and the keyboard logic are both housed within the keyboard housing.

2. The apparatus of claim 1, further comprising:

keys within a QUERTY area of the keyboard;

wherein said data storage device is situated within another area of the keyboard, in lieu of keys.

3. The apparatus of claim 1, wherein said data storage device is a disk drive.

4. The apparatus of claim 3, wherein said data storage device is a high-capacity floppy drive.

5. The apparatus of claim 3, wherein said data storage device is a Winchester-type drive.

6. The apparatus of claim 1, wherein said data storage device is an optical storage device.

7. The apparatus of claim 6, wherein said optical storage device is a CD ROM drive.

8. The apparatus of claim 7, wherein said CD ROM drive includes a headphone jack.

9. The apparatus of claim 7, further comprising:

a touch panel; and means response to touches on said touch panel for controlling operation of said CD ROM drive.

10. The apparatus of claim 9, further comprising:

an LCD display underlying said touch panel; and means for displaying touch areas on said LCD display.

11. The apparatus of claim 10, wherein, in one mode of operation, said touch areas are control buttons for controlling said CD ROM drive.

12. The apparatus of claim 11, wherein, in another mode of operation, said touch areas correspond to keys of a numeric keypad.

13. The apparatus of claim 6, wherein said optical storage device is a DVD drive.

\* \* \* \* \*